(12) United States Patent
Wen (10) Patent No.: US 9,778,839 B2
(45) Date of Patent: Oct. 3, 2017

(54) MOTION-BASED INPUT METHOD AND SYSTEM FOR ELECTRONIC DEVICE

(71) Applicant: SAP SE, Walldorf (DE)

(72) Inventor: Zongzhi Wen, Shanghai (CN)

(73) Assignee: SAP SE, Walldorf (DE)

( * ) Notice: Subject to any disclaimer, the term of this patent is extended or adjusted under 35 U.S.C. 154(b) by 10 days.

(21) Appl. No.: 13/940,745

(22) Filed: Jul. 12, 2013

(65) Prior Publication Data

US 2014/0361997 A1  Dec. 11, 2014

(30) Foreign Application Priority Data

Jun. 9, 2013  (CN) .......................... 2013 1 0231024

(51) Int. Cl.
*G06F 3/0488* (2013.01)
*G06F 3/0484* (2013.01)
*G06F 3/041* (2006.01)

(52) U.S. Cl.
CPC ...... *G06F 3/04883* (2013.01); *G06F 3/04847* (2013.01); *G06F 3/041* (2013.01)

(58) Field of Classification Search
CPC ....................................................... G06F 3/041
USPC ........................................................ 345/173
See application file for complete search history.

(56) References Cited

U.S. PATENT DOCUMENTS

| | | | |
|---|---|---|---|
| 5,684,873 A | 11/1997 | Tiilikainen | |
| 6,266,098 B1 | 7/2001 | Cove et al. | |
| 8,276,101 B2 | 9/2012 | Li | |
| 8,352,172 B2 | 1/2013 | Pei et al. | |
| 2005/0012705 A1* | 1/2005 | Akahori | G09G 5/006 345/99 |
| 2005/0052427 A1 | 3/2005 | Wu et al. | |
| 2006/0026521 A1 | 2/2006 | Hotelling et al. | |
| 2006/0092177 A1* | 5/2006 | Blasko | G04G 21/08 345/619 |
| 2008/0211785 A1 | 9/2008 | Hotelling et al. | |
| 2010/0103106 A1 | 4/2010 | Chui | |

(Continued)

FOREIGN PATENT DOCUMENTS

| | | |
|---|---|---|
| EP | 2472393 A1 | 4/2012 |
| WO | 2008033853 A2 | 3/2008 |

OTHER PUBLICATIONS

"Android wheel picker demo", Sep. 1, 2012 (Sep. 1, 2012), XP054975496, Retrieved from the Internet: URL:http://www.youtube.com/watch?v=cUGyvYjGkKA [retrieved on Aug. 27, 2014].

(Continued)

*Primary Examiner* — Jennifer Mehmood
*Assistant Examiner* — Carl Adams
(74) *Attorney, Agent, or Firm* — Jones Day (57) ABSTRACT

A method for efficient data input may include displaying a user interface, detecting a plurality of positions of an object, and, controlling a display screen to display a data content, in response to a plurality of movements of the object. If the controller determines the object moved substantially in a first direction, the display screen modifies the data content based on a group of data choices. If the controller determines the object moved substantially in a second direction, the controller stores, into a memory, the data content currently being displayed on the display screen.

19 Claims, 3 Drawing Sheets

(56) References Cited

U.S. PATENT DOCUMENTS

| | | |
|---|---|---|
| 2011/0227844 A1* | 9/2011 | Kim .................... G06F 3/04883 345/173 |
| 2011/0258537 A1 | 10/2011 | Rives et al. |
| 2011/0283242 A1 | 11/2011 | Chew et al. |
| 2012/0092267 A1 | 4/2012 | Haug |
| 2012/0159393 A1 | 6/2012 | Sethi |
| 2013/0033447 A1* | 2/2013 | Cho ........................ G06F 3/018 345/173 |
| 2013/0083076 A1 | 4/2013 | Liu et al. |
| 2013/0120271 A1 | 5/2013 | Lee et al. |
| 2013/0139084 A1 | 5/2013 | Han |

OTHER PUBLICATIONS

European Search Report for EP 14171194 dated Sep. 3, 2014.
European Office Action issued in European Patent Application 14 171 194.5, dated Oct. 12, 2015.

* cited by examiner

MOTION-BASED INPUT METHOD AND SYSTEM FOR ELECTRONIC DEVICE

BACKGROUND

The present disclosure generally relates to user data input process and system with a user interface.

A typical electronic device, such as a computer, may need a user to input some data via an input of the electronic device. The data from a user may include alphanumerical or character information. The alphanumerical or character information may typically include numbers and characters, from various languages of various world regions.

Traditionally, an electronic device may allow the user to input information via a keyboard, real physical or virtual touch screen type. A virtual touch screen keyboard would occupy much of the display screen of the electronic device, and interfere with visual enjoyment and experience of the user interacting with the electronic device. A user interface that includes such implementations of keyboards would be burdened with a bulky physical keyboard or a virtual touch screen keyboard.

Thus, there is a need to implement an electronic device to include a user interface that allows a user to input data efficiently without burdensome keyboards, real or virtual.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
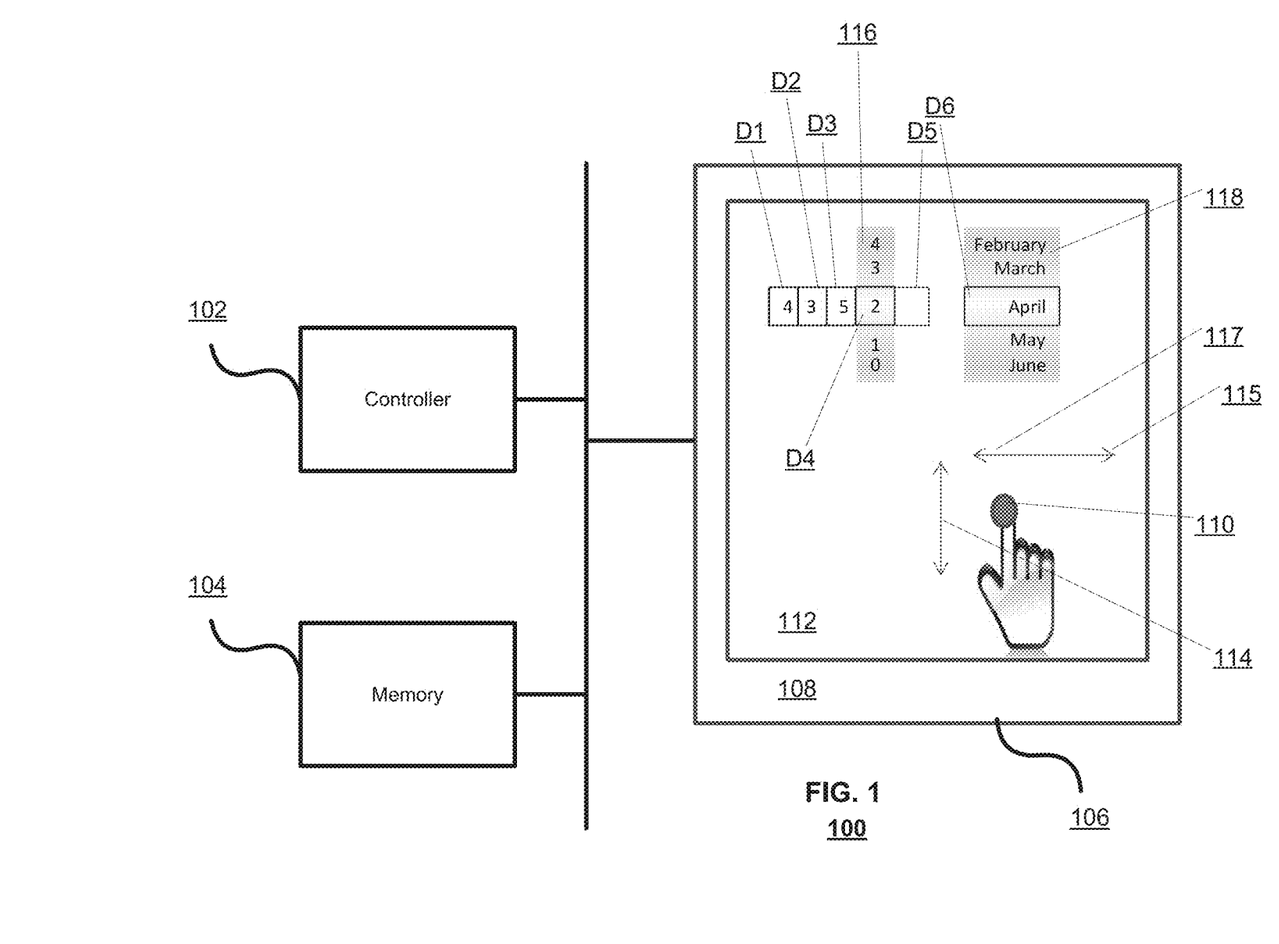
FIG. 1 illustrates an exemplary electronic device with a user interface according an embodiment.

FIG. 1 is an exemplary electronic device with a user interface according an embodiment.

The electronic device 100 is generally shown and may include a controller 102, which is generally indicated. The controller 102 may include a Central Processing Unit (CPU) with one or more processing cores, and may be included within, any one or more computers, servers, systems, communication networks or cloud environment. The electronic device 100 may further include a memory 104, a display screen 106, and an input 108, which are connected to the controller 102.

The memory 104 may include a static memory, a dynamic memory, or both. The memory 104 may additionally or alternatively include a hard disk, random access memory, a cache, a computer-readable medium storing instructions for execution in the electronic device 100, or any combination thereof. Of course, those skilled in the art appreciate that the memory 104 may comprise any combination of known memories or a single storage.

The display screen 106 may include, but is not limited to, a cathode ray tube (CRT), a liquid crystal display (LCD), a light projection display (LPD), a plasma display, a light emitting diode (LED) display. The display screen 106 may display a user interface 112. The user interface 112 may be a graphical user interface (GUI).

The input 108 may include, but is not limited to, a touch sensitive surface, a pressure detector, a light detector, a video camera, a sonic detector, and a magnetic field detector, any other device capable of detecting and tracking the position and movement of a portion of an object 110 or a plurality of objects, or any combination thereof. An object 110 to be detected by the input 108 may include one of a stylus, a user's fingers or hands, and a wand, or any other objects that can be detected and tracked by the input 108.

For example, the input 108 may include a touch sensitive surface on the outside surface of the display screen 106, and the input 108 detects and tracks the position and movements of the object 110, which may include the tip of a user's finger. The input 108 may track the position and movements of a user's finger tip as the user touches or moves the finger tip on the touch sensitive surface.

Alternatively, the input 108 may include a video camera that takes video images of a visual field and tracks the movement of a user's finger tip as the user moves the finger tip within the visual field. Alternatively, the input 108 may detect and track the movements of a stylus or a wand.

The controller 102 may control the display screen 106 to display data contents D1-D5, in response to movements of the object 110. For example, if the controller 102 determines the object 110 moved substantially in a first direction 114, the display screen 106 modifies the data content D4 based on a group of data choices 116, and if the controller determines the object moved substantially in a second direction 115, the controller 102 stores, into the memory 104, the data content D4 currently being displayed on the display screen 106.

For example, the controller 102 may control the display screen 106 to display in the user interface 112, a data content D4 along with a group of data choices 116. The group of data choices 116 may be displayed in the form of a scroll wheel with the possible data choices for the data content D4. The group of data choices 116 may be superimposed or overlayed with the data content D4 in the user interface 112, to signify that the data content D4 is the data content currently being selected or being modified by user input. Alternatively, the data content D4 may not be displayed until the user makes a selection from the group of data choices 116 by user input. The group of data choices 116 may be sorted in some logical order, such as alphabetical, ascending or descending, etc.

When the user moves the object 110 substantially in a first direction 114 (here for example, up or down), the display screen 106 may modify the data content D4, by for example scrolling through the possible data choices in group of data choices 116 (here for example, scrolling through numbers 0-9). Thus, the user may scroll through the possible data choices to select the desired data for data content D4 (here for example, the number 2).

If the controller 102 determines that there has not yet been any movements of the object 110, in one or more directions, the controller 110 may decide that there is no need for a specific data content, i.e. the data content D4 may be empty or may be the end of the group of data contents being inputted from the user. In such a case, the controller 102 may cause the display screen 106 to not display the group of data choices 116 at all.

When the user has selected the desired data for data content D4, the user may "commit" the data for data content D4, by moving the object 110 substantially in a second direction 115 (here for example, to the right). The controller 102 in response to this movement, stores, into the memory 104, the data content D4 currently being displayed (here for example, the number 2) on the display screen 106.

Thus, the data content D4 may be inputted by the user via the above described two movements and tracking by the electronic device 100.

After the data content D4 is inputted by the user by the above movements and tracking by the electronic device 100, the electronic device 100 may further track the movements of the object 110 for the next data content D5, or a different data content D6 (here for example, for a month data field entry, to be selected from a group of data choices of months 118).

The user may commit or finalize the entire group of data contents D1-D4, after a sequence of movements of the object 110 by the user, by lifting the object 110 from the touch sensitive surface of the input 108.

The user may wish to go back to change the previously committed/saved data content D4. To do so, the user may move the object 110 substantially in a third direction 117 (here for example, to the left) opposite to the second direction 115. The controller 102, in response to this movement of the object 110, may "de-commit" the previously committed/saved data content D4. Once data content D4 is de-committed, the controller 102 may control the display screen 106 to display and modify the data content D4 according to the above described movements of the object 110 by the user, and then may re-commit data content D4.

The user may go further back to other previously committed/saved data contents D1-D3 for further modification. While doing so, the controller 102 and the display screen 106 may or may not discard any current selections in data contents D4-D5.

The above sequences of input movements may be performed with the object 110 touching and moving on a touch sensitive surface of the input 108, to input multiple data contents D1-D5 of numbers or characters without lifting the object 110 from the touch sensitive surface of the input 108.

While the above example movements are described as relating to the input of individual alphanumerical characters, similar input sequences may be used to input groups of alphanumerical characters, such as the names of months in data content D6.

Additionally, groups of alphabetical characters in the forms of phonemes or syllables of words may be presented in the group of data choices, determined based upon dictionary, grammar, and/or autocomplete features and previous data contents in the electronic device 100. For example, if the user has already inputted the alphabets "typ" in previous data contents D1-D3, the controller 102 may determine from the data contents D1-D3 and dictionary, possible multiple character data choices for D4: "e," "ed," "es," "ing," "ist," and etc. The controller 102 then may control the display screen 106 to present these multiple character data choices for D4 in the form of a scroll wheel in the user interface 112. In doing so, the user can input multiple characters in a single data content in one time, while limiting the number of possible data choices for a single data content down to a manageable size.

Additionally, context or property of a data content may also limit the number of possible data choices for the data content. For example, if D1's property or context indicates that it should contain the number to represent the hour number of a time value, then there are only 24 possible numerical values as data choices for D1. Additionally, the user interface 112 environment may contain information for possible data choices. For example, if the data contents D1-D4 are for a specific data field in a webpage, the webpage may already contain limited number of possible data choices for the data contents D1-D4. The controller 102 may determine the possible data choices received from the webpage (i.e. external data), and use these data choices to be displayed in the group of data choices 116.

Furthermore, input of data contents D1-D5 may be further aided by limiting data choices via other ways, for example, by speech recognition or handwriting. For example, the electronic device 100 may perform speech recognition on a segment of audio speech, and the controller 102 may generate a group of data choices 116 that are the words most closely corresponding to the phonemes in the segment of audio speech. For example, the user may speak a word into a microphone (not shown) connected to the electronic device 100. The controller 102 then analyzes the spoken word, and determines five to ten best matching words in a dictionary or a database, and then uses the five to ten matching words as the group of data choices 116 for the user to select as a data content D1-D4.

Speech recognition traditionally presents a fairly rapid way for a user to input data. However, speech recognition can be very inaccurate, given similarities in some phonemes and some speech anomalies in individual users. By combining speech recognition with the rapid movement input process of the present disclosure, the user may use speech recognition to limit data choices to speed up the movement input process, while the movement input process of the present disclosure to compensate for inaccuracies in the speech recognition input process.

Additionally, the controller 102 may track and correlate results of speech recognition and the movement input process of the present disclosure, and use the historical results and performance information to improve the performance of speech recognition over time.

While the movements described above are described in directions as relative to the display screen 106 and its orientation, it is also possible for the electronic device 100 to track the movements of the object 110 as relative to one or more of the user's body orientation, a viewer's orientation, a video projection screen, the direction of gravity, the edge of another object, and etc. Additionally, the movements may be additionally tracked in other directions (for example, in and out), to allow the user to interact and select additional data choices for a data content. For example, moving the object 110 in the "in or out" direction may cause the display screen 106 to switch the property or the type of a data contents D1-D5, such as from alphabets to numbers, or to switch format of the data contents, from numbers in Roman numeral or in hexadecimal.

Figure 2:
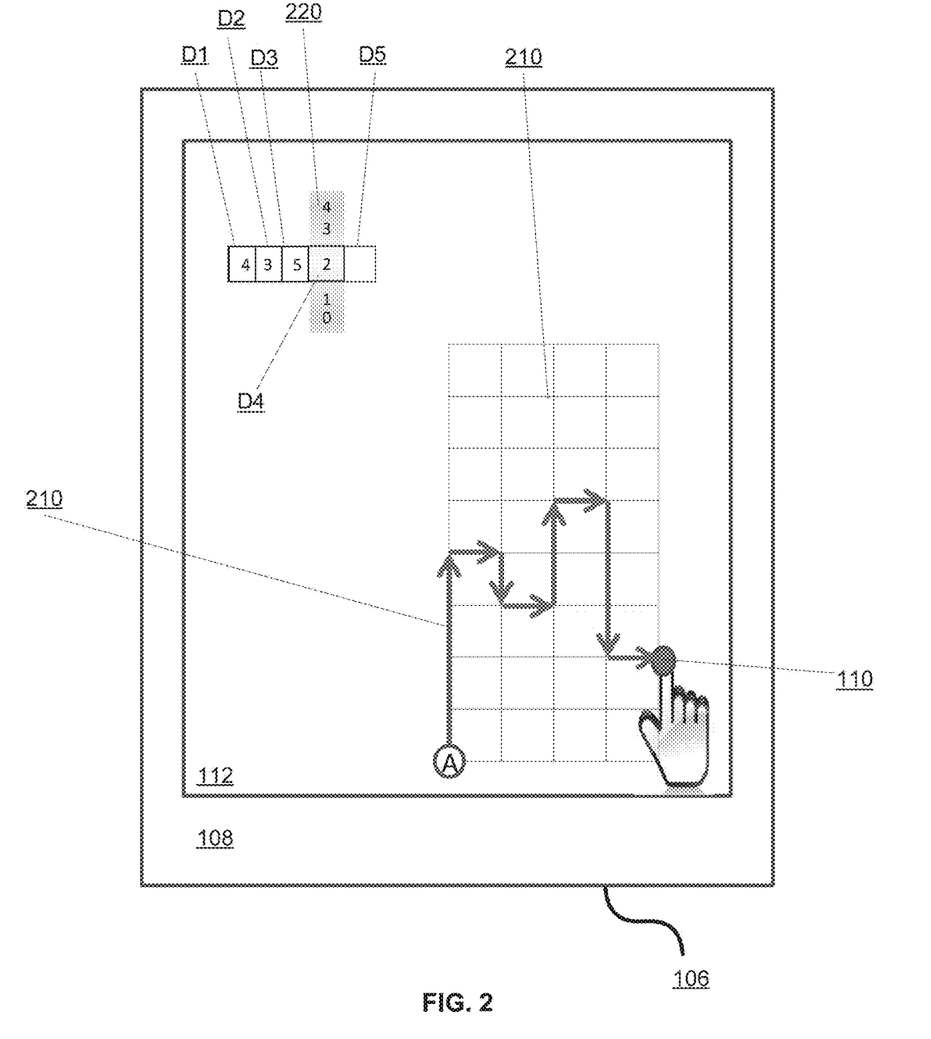
FIG. 2 illustrates an exemplary input movement sequence according to an embodiment.

FIG. 2 illustrates an exemplary input movement sequence 200 for data contents D1-D4, according to an embodiment.

The controller 102 may detect and track the position and movements of the object 110, as the user touches and moves the object 110 on the sensitive surface of the input 108. The display screen 106 may display the data content D1-D5.

The user may begin the sequence by touching the object 110 down on the touch sensitive surface of the input 108, at an initial point A. When the user touches the object 110 down at initial point A, the controller 102 may determine that the movement input process has begun, selects a data content D1 for input, and control the display screen 106 to display group of possible data choices for D1. For example, the controller 102 may determine that data contents D1-D5 are to contain numbers, and possible data choices for each of data contents D1-D5 would be numbers 0-9. The controller 102 may control the display screen 106 to display the possible data choices in the form of a scroll wheel 220 containing the numbers 0-9.

The controller 102 may track the position and movements of the object 110, relative to a movement grid 210, which may be predefined by the controller 102 or the input 108 or the display screen 106 according to units of dimensions. Here for example, the movement grid 210 is shown as having 8 units in the Y-dimension (Up-Down direction) parallel to a vertical edge of the display screen 106, and 4 units in the X-dimension (Left-Right direction) parallel to a horizontal edge of the display screen 106.

For simplicity and to avoid interfering with the user's visual experiences of the user interface, the movement grid 210 may be not displayed on display screen 106. Alternatively, for accuracy of user input, the movement grid 210 may be displayed on display screen 106. Or, the controller 102 may decide whether to display the movement grid 210 according to a user setting in the electronic device 100.

Additionally, the movement grid 210 may be aligned vertically or horizontally to an initial point A, set at where the user initially "touch down" the object 110 on the touch sensitive surface of the input 108. Via this alignment of the movement grid 210, the user may effectively initiate the movement input process from anywhere on the touch sensitive surface of the input 108. Additionally, the movement grid may be resized with different unit of dimensions as needed by the number of possible data choices 116, so to avoid where the object 110 is forced outside of the detection range of the input 108 (i.e. the edges of the touch screen).

Additionally, the alignment may be done to offset or compensate for the initial position A. For example, if the initial position A is on the right half side of the touch sensitive surface of the input 108, then the horizontal unit of dimension of the movement grid 210 may be decreased to compensate for the offset of the initial position A.

This may be considered as referencing the position of the object 110 relative to the initial position A.

As exemplarily shown in FIG. 2, the user may move the object 110 from initial position A in the up direction by 4 units. Interactively, in response to the movement of the object 110 in the up direction, the display screen 106 displays the scroll wheel 220 spinning or scrolling, and showing the data content D1 as changing from 0 to 1, to 2, to 3, then to 4, corresponding to the changing position of the object 110 relative to and on the movement grid 210 (along the Y-dimension).

Next, the user may move the object 110 in the right direction by 1 unit. Interactively, in response to the movement of the object 110 in the right direction, the controller 102 commits the data (the number 4) currently being displayed for data content D1 by saving the data of the data content D1 into memory 104. Then, the display screen 106 may displays the scroll wheel 220 as shifted to the right direction by 1 digit place, while maintaining display of the data content D1, to signify that data content D1 is committed and that data content D2 is ready for input. In shifting the scroll wheel 220 to the right direction by 1 digital place, the scroll wheel 220 may maintain its data value from the data content D1 (the number 4). This is because the position of the object 110 in the Y-dimension on the movement grid 210 is still 4 units from the initial position A.

Next, the user may move the object 110 in the down direction by 1 unit, to a position of 3 units from initial point A in the Y-dimension. Interactively, in response to the movement of the object 110 in the down direction, the display screen 106 displays the scroll wheel 220 spinning or scrolling, and showing the data content D2 as changing from 4 to 3, corresponding to the changing position of the object 110 relative to and on the movement grid 210 (along the Y-dimension).

Next, the user may move the object 110 in the right direction by 1 unit. Interactively, in response to the movement of the object 110 in the right direction, the controller 102 commits the data (the number 3) currently being displayed for data content D2 by saving the data of the data content D2 into memory 104. Then, the display screen 106 may display the scroll wheel 220 as shifted to the right direction by 1 digit place, while maintaining display of the data content D2, to signify that data content D2 is committed and that data content D3 is ready for input. In shifting the scroll wheel 220 to the right direction by 1 digital place, the scroll wheel 220 may maintain its data value from the data content D2 (the number 3). This is because the position of the object 110 in the Y-dimension on the movement grid 210 is still 3 units from the initial position A.

Next, the user may move the object 110 in the up direction by 2 units, to a position of 5 units from initial point A in the Y-dimension. Interactively, in response to the movement of the object 110 in the up direction, the display screen 106 displays the scroll wheel 220 spinning or scrolling, and showing the data content D3 as changing from 3 to 4, then to 5, corresponding to the changing position of the object 110 relative to and on the movement grid 210 (along the Y-dimension).

Next, the user may move the object 110 in the right direction by 1 unit. Interactively, in response to the movement of the object 110 in the right direction, the controller 102 commits the data (the number 5) currently being displayed for data content D3 by saving the data of the data content D3 into memory 104. Then, the display screen 106 may displays the scroll wheel 220 as shifted to the right direction by 1 digit place, while maintaining display of the data content D3, to signify that data content D3 is committed and that data content D4 is ready for input. In shifting the scroll wheel 220 to the right direction by 1 digital place, the scroll wheel 220 may maintain its data value from the data content D3 (the number 5). This is because the position of the object 110 in the Y-dimension on the movement grid 210 is still 5 units from the initial position A.

Next, the user may move the object 110 in the down direction by 3 units, to a position of 2 units from initial point A in the Y-dimension. Interactively, in response to the movement of the object 110 in the down direction, the display screen 106 displays the scroll wheel 220 spinning or scrolling, and showing the data content D4 as changing from 5 to 4, to 3, then to 2, corresponding to the changing position of the object 110 relative to and on the movement grid 210 (along the Y-dimension).

Next, the user may move the object 110 in the right direction by 1 unit. Interactively, in response to the movement of the object 110 in the right direction, the controller 102 commits the data (the number 2) currently being displayed for data content D4 by saving the data of the data content D4 into memory 104. Then, the display screen 106 may displays the scroll wheel 220 as shifted to the right direction by 1 digit place, while maintaining display of the data content D4, to signify that data content D4 is committed and that data content D5 is ready for input. In shifting the scroll wheel 220 to the right direction by 1 digital place, the scroll wheel 220 may maintain its data value from the data content D4 (the number 2). This is because the position of the object 110 in the Y-dimension on the movement grid 210 is still 2 units from the initial position A.

At this point, data contents D1-D4 are inputted by the above movement and tracking process, and data content D5 may be ready for input.

While the above movements may be referenced to a movement grid 210, to determine distance of each movement along the X and Y dimensions. However, such an implementation may be too tolerant, and may erroneously interpret and respond to certain movements, for example, diagonal movements. This may be due to the measurement referenced to initial point A.

To prevent erroneous interpretation of the movements of the object 110, the controller may track only movements of the object 110 in the X and Y dimensions, and may selectively ignore any movements of the object 110 that do not meet some threshold criteria, for example, tracking the movements of the object 110 referenced based on a prior turning point, and ignoring any movements that are not substantially along the X and Y dimensions (within a certain angle range).

Alternatively, above described response to tracking of up and down movements may not need to be based upon number of units of movements, but may be based a joystick style control response process. For example, the controller 102 may respond to any up or down displacement of object 110 from initial point A to begin to scroll the scroll wheel 220, and stop scrolling the scroll wheel 220 when the object 110 returns to initial point A. Or, the controller 102 may respond to any up or down displacement of object 110 from initial point A to scroll the scroll wheel 220 by a set amount or a set number of data choices, the user may then return the object 110 back to initial point A, and then move the object 110 again in in the up and down direction to cause the controller 102 to respond to scroll the scroll wheel 220 again by a set amount or a set number of data choices, in a pulsed movement fashion.

The electronic device 100, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single electronic device 100 is illustrated, addition embodiments may include any collection of systems or sub-systems that individually or jointly execute instructions or perform functions.

The electronic device 100 may be in communication with one or more additional computer a network, which may be, but is not limited to, a local area network, a wide area network, the Internet, a telephony network, or any other network commonly known and understood in the art.

Of course, those skilled in the art appreciate that the above-listed components of the electronic device 100 are merely meant to be exemplary and are not intended to be exhaustive and/or inclusive. Furthermore, the examples of the components listed above are also meant to be exemplary and similarly are not meant to be exhaustive and/or inclusive.

Figure 3:
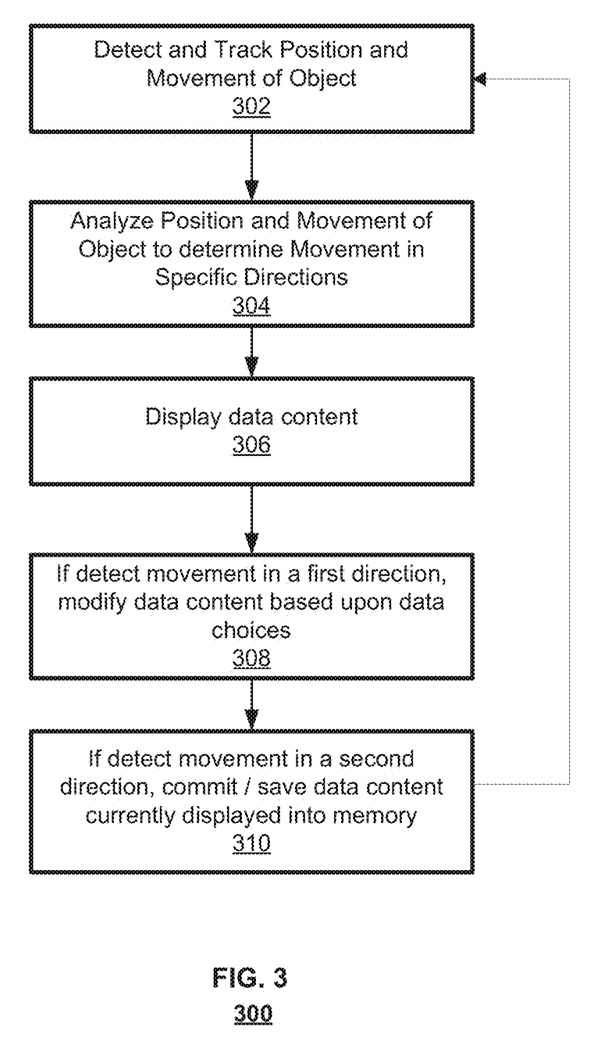
FIG. 3 illustrates an exemplary input process according to an embodiment.

FIG. 3 illustrates an exemplary input method 300 according to an embodiment.

Process 300 starts at step 302, the input 108 may detect and track position and movement of object 110, and the process 300 may proceed to step 304.

At step 304, the controller 102 may analyze position and movement of object 110, and detect for specific patterns of movement, for example in specific directions.

At step 306, the display screen 106 may display data contents.

At step 308, if the controller 102 determines the object 110 moved substantially in a first direction, the display screen 106 modifies the data content based on a group of data choices.

At step 310, if the controller 102 determines the object 110 moved substantially in a second direction, the controller 102 stores, into the memory 104, the data content currently being displayed on the display screen 106, and proceed to step 302.

It is appreciated that the disclosure is not limited to the described embodiments, and that any number of scenarios and embodiments may exist.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An electronic device comprising:
a display screen displaying a user interface;
a memory;
an input device detecting a plurality of positions of an object displayed on the user interface; and
a controller, interactively in response to one or more movements of the object detected on a grid defined by an input touch down point on the display screen, controlling the display screen to display, in real time, a data content, the data content based on a group of data choices, wherein the grid is a Cartesian coordinate system defined by the input touch down point and aligned vertically and horizontally based on the input touch down point,
wherein if the controller determines the object moved substantially in a first direction on the grid relative to the input touch down point, the display screen interactively modifies, in real time, the data content based on a magnitude of the movement relative to a most recently displayed data content,
if the controller determines the object moved substantially in a second direction, the controller stores, into the memory, the data content currently being displayed on the display screen, and after storing the data content currently being displayed on the display screen, controls the display screen to display another data content, and
if the controller determines the object moved substantially in a third direction opposite to the second direction, the controller causes the display screen to highlight and de-commit a previous data content for modification based on a previous group of data choices.

2. The electronic device of claim 1, wherein the first direction is substantially parallel to a vertical edge of the display screen.

3. The electronic device of claim 1, wherein the second direction is substantially parallel to a horizontal edge of the display screen.

4. The electronic device of claim 1, wherein the input device comprises at least one of a touch sensitive surface, a pressure detector, a light detector, a video camera, a sonic detector, and a magnetic field detector.

5. The electronic device of claim 1, wherein the object comprises at least one of a stylus, a user's finger, and a wand.

6. The electronic device of claim 1, wherein the data content comprises at least one of a text character, a text string representing a phoneme or a syllable of a word, a date, a month, a weekday, a year, and an emoticon.

7. The electronic device of claim 1, wherein the group of data choices is generated by the controller based upon properties of the data content or a previous data content of the user interface.

8. The electronic device of claim 1, wherein the group of data choices is generated by the controller based upon speech recognition of a segment of user speech.

9. A method comprising:
displaying, by a display screen, a user interface;
detecting, by an input device, a plurality of positions of an object displayed on the user interface; and
controlling, by a controller, the display screen to display, in real time, a content, interactively in response to one or more movements of the object detected on a grid defined by an input touch down point on the display screen, the data content based on a group of data choices, where the grid is a Cartesian coordinate system defined by the input touch down point and aligned vertically and horizontally based on the input touch down point, wherein if the controller determines the object moved substantially in a first direction on the grid relative to the input touch down point, the display screen interactively modifies, in real time, the data content based on a magnitude of the movement relative to a most recently displayed data content, if the controller determines the object moved substantially in a second direction, the controller stores, into the memory, the data content currently being displayed on the display screen, and after storing the data content currently being displayed on the display screen, controls the display screen to display another data content, and if the controller determines the object moved substantially in a third direction opposite to the second direction, the controller causes the display screen to highlight and de-commit a previous data content for modification based on a previous group of data choices.

10. The method of claim 9, wherein the first direction is substantially parallel to a vertical edge of the display screen.

11. The method of claim 9, wherein the second direction is substantially parallel to a horizontal edge of the display screen.

12. The method of claim 9, wherein the input device comprises at least one of a touch sensitive surface, a pressure detector, a light detector, a video camera, a sonic detector, and a magnetic field detector.

13. The method of claim 9, wherein the object comprises at least one of a stylus, a user's finger, and a wand.

14. The method of claim 9, wherein the data content comprises at least one of a text character, a text string representing a phoneme or a syllable of a word, a date, a month, a weekday, a year, and an emoticon.

15. The method of claim 9, wherein the group of data choices is generated by the controller based upon properties of the data content or a previous data content of the user interface.

16. The method of claim 9, wherein the group of data choices is generated by the controller based upon speech recognition of a segment of user speech.

17. A non-transitory computer-readable medium storing program instructions that, when executed, cause a processor to perform a method, the method comprising:

displaying, by a display screen, a user interface;

detecting, by an input device, a plurality of positions of an object detected on a grid defined by an input touch down point on the display screen; and controlling, by a controller, the display screen to display, in real time, a data content based on a group of data choices, interactively in response to one or more movements of the object, wherein the grid is a Cartesian coordinate system defined by the input touch down point and aligned vertically and horizontally based on the input touch down point, wherein if the controller determines the object moved substantially in a first direction, the display screen interactively modifies, in real time, the data content, the value of the modified data content being based on a magnitude of movement in the first direction, if the controller determines the object moved substantially in a second direction, the controller stores, into a memory, the data content currently being displayed on the display screen and after storing the data content currently being displayed on the display screen, controls the display screen to display another data content, and if the controller determines the object moved substantially in a third direction opposite to the second direction, the controller causes the display screen to highlight and de-commit a previous data content for modification based on a previous group of data choices.

18. A method of rendering a graphical user interface, on a client device having a touch sensitive surface, implemented by one or more data processors forming part of at least one computing device, the method comprising:

providing, by at least one data processor, a grid to track a magnitude of movement of an object on the graphical user interface, wherein the grid is defined by an input touch down point on the touch sensitive surface and the grid is a Cartesian coordinate system defined by the input touch down point and aligned vertically and horizontally based on the input touchdown point;

initiating display, by at least one data processor, on the graphical user interface of a plurality of spaces for receiving input via the object;

responsive to receiving a stimulus by the object, enabling, by at least one data processor, modification of a first one of the plurality of input spaces;

modifying, by at least one data processor in real time, content of the first input space based on movement substantially parallel to a first axis of the grid, the content of the first input space correlated with a magnitude of movement along the first axis;

responsive to movement substantially parallel to a second axis of the grid, at least one of:

committing, by at least one data processor, the content to the first input space and/or enabling, by at least one data processor, modification of a second one of the input spaces; and responsive to movement substantially parallel to the second axis of the grid in an opposite direction, highlighting and de-committing a previous content of a previous input space for modification based on a previous group of content choices, wherein the display of the graphical user interface is updated substantially in real time with the modification and committing of the content.

19. The method of claim 18, wherein the grid is not displayed on the graphical user interface.

* * * * *